United States Patent [19]

Horwill

[11] Patent Number: 5,595,416
[45] Date of Patent: Jan. 21, 1997

[54] RETAINING CLIPS FOR VEHICLE HOOD PROTECTORS

[76] Inventor: Rodney E. Horwill, P.O. Box 171, Salisbury Queensland 4107, Australia

[21] Appl. No.: 510,666

[22] Filed: Aug. 3, 1995

[30] Foreign Application Priority Data

Aug. 5, 1994 [AU] Australia .................. PM7269

[51] Int. Cl.⁶ .................................................. B62D 35/00
[52] U.S. Cl. .................. 296/91; 24/535; 24/295
[58] Field of Search ...................... 296/91, 180.1, 296/180.2; 24/535, 295, 569, 290

[56] References Cited

U.S. PATENT DOCUMENTS

| | | | |
|---|---|---|---|
| 5,067,206 | 11/1991 | Metcalfe | 24/290 |
| 5,172,877 | 12/1992 | Hattori et al. | 24/535 X |
| 5,234,247 | 8/1993 | Pacer | 296/91 |
| 5,292,166 | 3/1994 | Emery | 296/91 |

FOREIGN PATENT DOCUMENTS

515390   5/1953   Belgium ...................... 296/91

*Primary Examiner*—Joseph D. Pape
*Attorney, Agent, or Firm*—Shoemaker and Mattare Ltd.

[57] ABSTRACT

Retaining clips for vehicle hood protectors for securing hood protectors to the hood of a motor vehicle and including first and second gripping portions which may be located on opposite sides of a leading end of the vehicle hood for gripping the hood. A screw fastener is provided to urge the gripping portions towards each other to clamp the gripping portions to the hood. The hood protector may be secured to the retaining clip by screw fasteners or by a resilient gripping member.

17 Claims, 6 Drawing Sheets

RETAINING CLIPS FOR VEHICLE HOOD PROTECTORS

TECHNICAL FIELD

This invention relates to retaining clips, particularly applicable to retaining vehicle hood protectors or air deflectors to a vehicle hood.

BACKGROUND ART

Vehicle hood protectors or air deflectors of many different designs are available. Generally such devices comprise a panel of shaped sheet material, often a plastics material which is arranged at the front of the vehicle adjacent to the hood to protect the hood from stone chips or other damage, and/or to deflect air and insects away from the vehicle windscreen. There are a number of methods used to fasten protectors or deflectors of the above type to a vehicle hood, however, primarily the methods used involve semi permanent fasteners, such as screws which pass through the protector into the hood to directly secure the protector to the hood. To enable such attachment to be made the hood is required to be drilled and/or tapped in a number of places to accept the thread of the fastening screws or a securing plug. An example of such an arrangement is shown in U.S. Pat. No. 5234247 to Packer. This known method is obviously time consuming and inconvenient. Furthermore, this method makes it difficult to detach the protector for replacement and repair. Drilling also penetrates the paintwork giving rise to possible corrosion problems.

SUMMARY OF THE INVENTION

The present invention aims to overcome or alleviate the above disadvantages or at least to provide an alternative to the known attachment methods by providing a retaining clip for retaining a vehicle hood protector or shield or the like to a vehicle hood in a simple and effective manner which does not involve a permanent connection and which enables such protectors to be easily installed. The present invention further aims to provide a retaining clip which may be simply connected, both to the vehicle hood and the deflector. Other objects and advantages of the invention will become apparent from the following description.

The present invention thus provides in one aspect, a retaining clip for securing a hood protector or shield to a vehicle hood said retaining clip including first and second spaced apart gripping portions adapted to be located on opposite sides of a leading end of said hood, and means for selectively urging said first and second gripping portions relatively towards each other for gripping said portion of said hood to retain said protector or shield to said hood.

The first and second gripping portions may include a pair of spaced apart members which define a channel or recess therebetween into which a leading edge or lip of the hood may project. The urging means may comprise a screw fastener which, when tightened either urges one member towards the other member or urges both members together. In one form, the screw fastener is threadably engaged with a flange spaced from one of the members, such that when rotated the leading end of the screw abuts one member and urges it towards the other member.

In a second form the screw fastener may extend between both members at a position spaced from the leading edge or lip, whereby when the screw fastener is tightened the members are urged together. One of the members for this purpose may include a threaded aperture, or thread formation, whilst the other member may have an opposite aligned aperture into which the screw fastener may pass.

One or both members may have on their inner faces projections which serve to securely engage the edge or lip of the hood to reduce the risk of detachment.

The clip, in one form may include a further portion for receiving and holding an edge of the hood protector. This further portion may be in the form of a channel shaped member to receive the edge of the hood protector, the channel shaped member having at least one resilient arm whereby the edge of the hood protector may be resiliently gripped. The one arm may also include at its leading end a barb which may locate within a slot or recess within the hood protector edge so as to positively engage same. The clip may include a pair of spaced apart channel shaped members arranged on opposite sides of the gripping portions. In the above form, the clip is preferably formed of a plastics material.

In a further form, the retaining clip includes a flange which may be secured to an edge portion for example a return edge portion of the protector or guard. The flange may be secured to the edge portion by means of any suitable fastener such as a conventional screw fastener passed through the protector or guard and threadably engaged with the flange.

In yet a further form the hood may have a return flange and the protector or guard may also include a return flange, the respective flanges being juxtaposed. The first and second portion may be located on opposite sides of the flanges to grip same and hold them together in a juxtaposed attitude.

The retaining clips in this form may be formed of any suitable material, such as metal or plastics however spring steel is preferred. The spring steel is preferably covered with a plastics coating, such as nylon to reduce damage to the protector and hood.

In a further aspect, the present invention provides a hood protector or shield adapted to be mounted to the hood of a vehicle to extend transversely of said vehicle, said hood protector or shield having a return flange and said hood having a leading end portion, and at least one retaining clip for securing said protector or shield return flange to said vehicle hood, said retaining clip having first and second integrally spaced apart gripping portions, said gripping portions being adapted to be located on opposite sides of said leading end portion of said vehicle hood, and means associated with said first and second gripping portions and adapted to be actuated to urge said gripping portions relatively towards each other to secure said clip to said hood and said hood protector return flange to said hood.

The retaining clip may include a flange portion which is secured to the return flange of the protector or shield. The flange portion may include threaded configuration and the protector return flange may be secured to the flange portion by a threaded fastener engaged with the threaded configuration in the flange portion. The flange portion may comprise an extension of one of the gripping portions. The retaining clip may include stop means between the one gripping portion and flange portion, the stop means engaging with the hood at a position remote from the return flange.

In a further form, the protector return flange is located between the gripping portions of the retaining clip and is juxtaposed with the leading end of the hood.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE EMBODIMENTS

Figure 1:
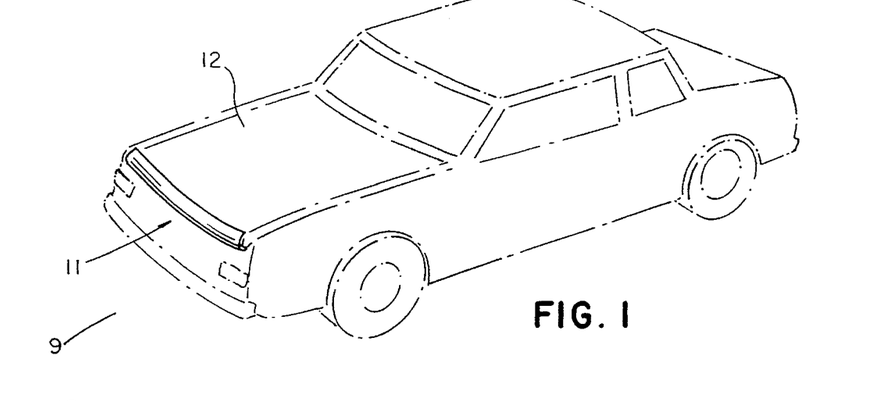
FIG. 1 illustrates a vehicle provided with a hood protector or deflector secured in position by the clips of the present invention.

Referring to the drawings and firstly to FIG. 1 there is illustrated a vehicle 9 provided with a hood protector or shield 11 at its forward end, the shield 11 being secured to the hood 12 of the vehicle 10 and extending across the front thereof to deflect air, debris and insects over the vehicle windscreen 13 and to protect the hood 12. The shield 11 is normally constructed of a plastics material and is secured to the hood 12 by the retaining clips of the present invention. FIG. 1 illustrates a first form of retaining clip 10 according to the present invention for retaining the hood protector 11 to the vehicle hood 12. The clip 10, which is preferably moulded of a resilient plastics material, includes a first central clip portion 13 which defines an upwardly facing channel 14, the clip portion 13 being integrally formed with an arm 15 which extends to either side of the clip portion 13 and defines at each end, second clip portions 16 for engaging with the vehicle hood protector 11. The clip portions 16 are also of channel shaped form as at 17 but open in an opposite direction to the channel 14.

Figure 3:
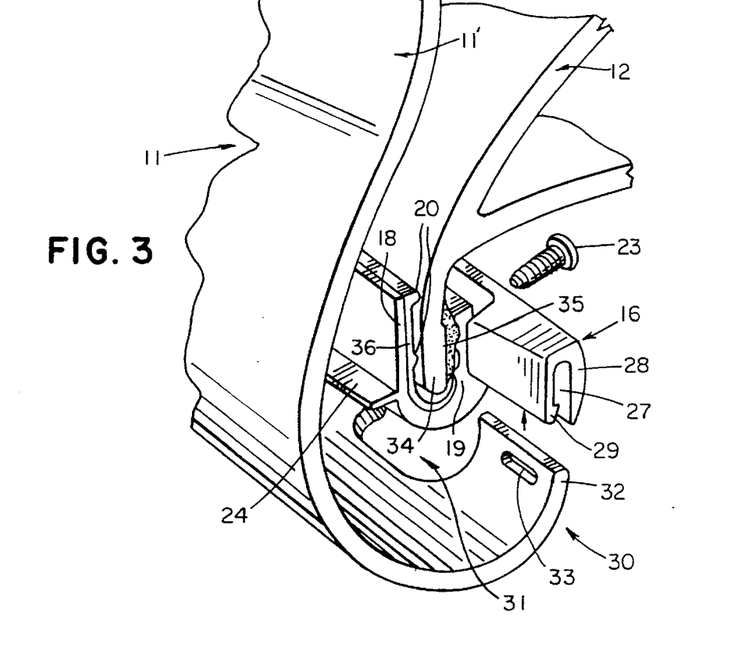
FIG. 3 illustrates the manner in which a retaining clip similar to the embodiment of FIG. 2 retains a hood protector to a vehicle hood.
Figures 4, 5:
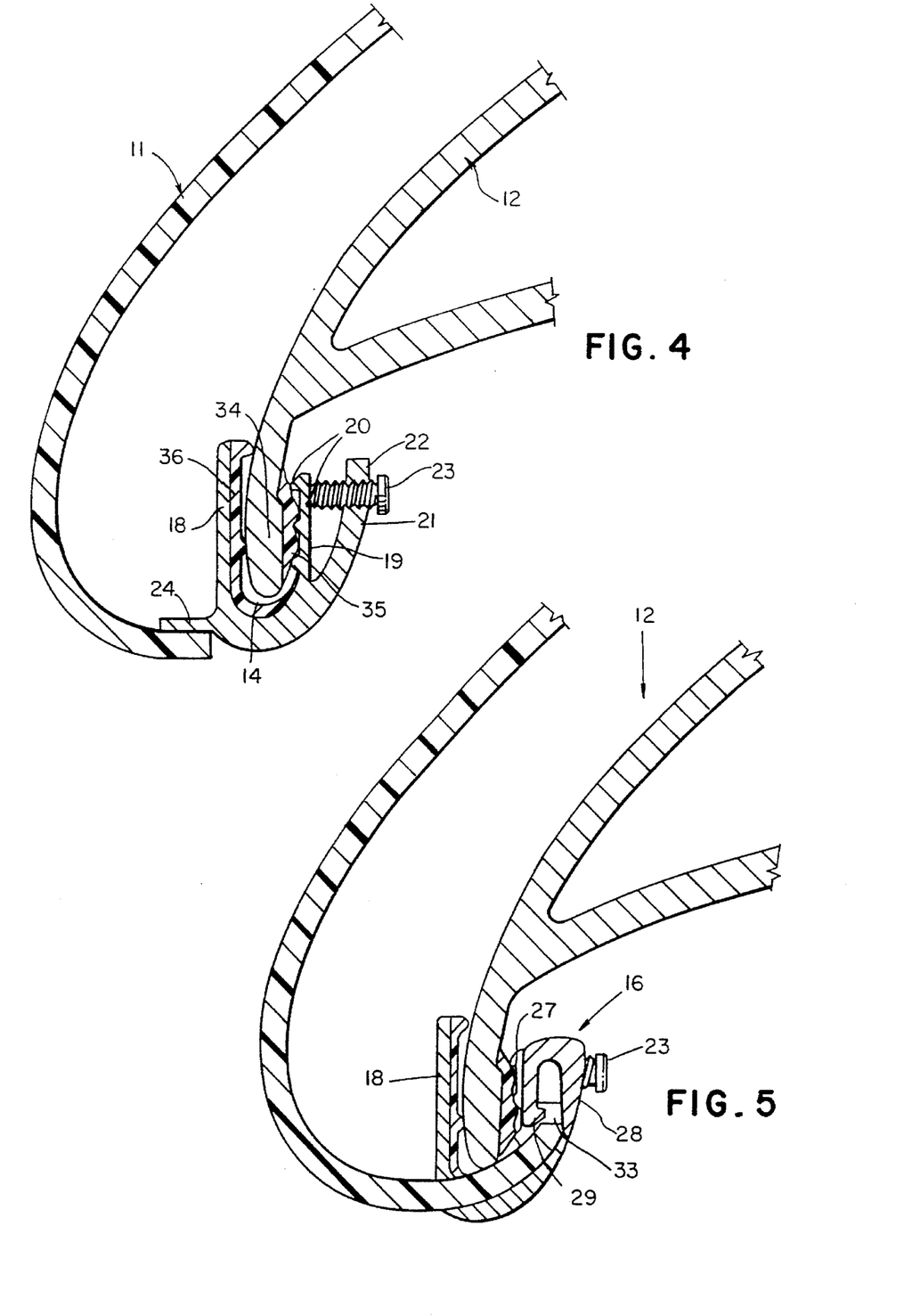
FIG. 4 is a sectional view through the centre of the clip showing the manner in which the clip is secured to the hood.
FIG. 5 is a sectional view through the outer arm of the clip showing the manner in which the clip is secured to the hood protector.

As is more apparent in FIGS. 3 to 5, the clip portion 13 has a pair of spaced apart flanges 18 and 19 which define the channel 14. Each flange 18 and 19 has on its inner face ribs or projections 20 which facilitate the gripping of the leading edge or lip of a vehicle hood as described further below.

The arm 15 includes a further flange 21 spaced from the flange 19, the flange 21 having a centrally arranged threaded aperture 22 for receipt of a screw 23, the leading end of which may abut the flange 19. The clip portion 13 additionally includes a forwardly extending flange 24 which defines a stop for the protector 11 for a purpose to be described further below.

Each clip portion 16 also includes a pair of spaced apart members 27 and 28 which define therebetween the channel 17. The member 28 comprises an extension of the arm 15 and is therefore relatively rigid, whilst the other member 27 is spaced from the member 28 and is resiliently movable relative to the member 28. The leading end of the member 27 includes an inwardly directed projection or barb 29.

The hood protector 11, for attachment to the hood 12 is in this embodiment of the form as shown in FIG. 3, including an upright deflecting portion 11' and having a lower return flange 30. For engagement with the clip 10 a recess 31 is formed in the return flange 30, the recess 31 defining a curved tongue 32 at the end of the protector 11. A similar arrangement is provided at the opposite end of the protector 11. A recess or slot 33 is provided in the flange 30 adjacent the tongue 32 and a similar recess or opening (not shown) is provided in the return flange 30 on the opposite side of the recess 31.

In use, and for securing a hood protector 11 to the hood 12 of a vehicle, the clip 10 may be either firstly engaged with the hood 12 or protector 11 with the latter being preferred. For engagement with the hood 12, the leading end or lip 34 thereof is inserted into the channel 14. If desired, a packing material or seal 35, either present on the hood 12 or applied to the hood 12, is interposed between the lip 34 and the flange 19. A similar seal (not shown) may be provided between the member 18 and the lip 34 on the outside of the hood 12. Preferably, however, the inner face of the flange 18 is provided with an integrally formed soft skin 36. This protects the hood 12 from damage. To retain the clip portion 13 in position, the screw 23 is then tightened to urge the flange 19 inwardly so that a clamping force is applied to the lip 34 to clamp it between the flanges 18 and 19.

For engagement of the hood protector 11, the return portion 30 is inserted into the channels 17 of the clip portion 16 by resilient urging the member 27 outwardly until a position is reached where the barb 29 snaps into or locates within the opening or recess 33 as shown in FIG. 5 with the body of the clip portion 13 locating within the recess 31 in the protector 11. In this position, the hood protector 11 is secured to the hood 12. The forwardly extending flange 24 also adds to support of the protector 11 seating on an edge thereof rearwardly of the recess 31 as shown in FIG. 4. This will serve to resist wind loadings causing twisting of the protector 11 clockwise from its position of FIG. 4.

For detachment, the members 27 may be simply urged away from the member 28 to release the barb 29 from the recess 33 and thus the return portion 30 of the protector 11. Similarly, if the clip 10 is required to be removed from the hood 12, the screw 23 is simply loosened which will permit release of the lip 34 from the channel 4.

Figure 6:
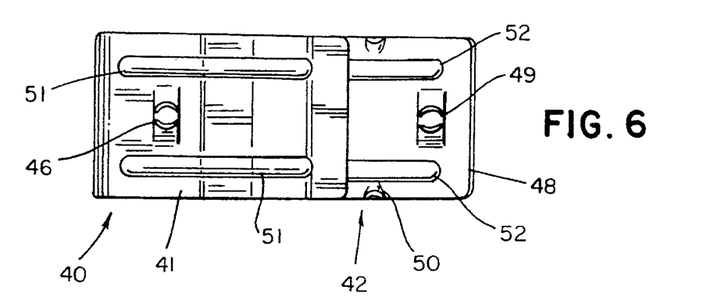
FIGS. 6 and 7 illustrate in plan and perspective views a further form of clip according to the present invention.
Figure 7:
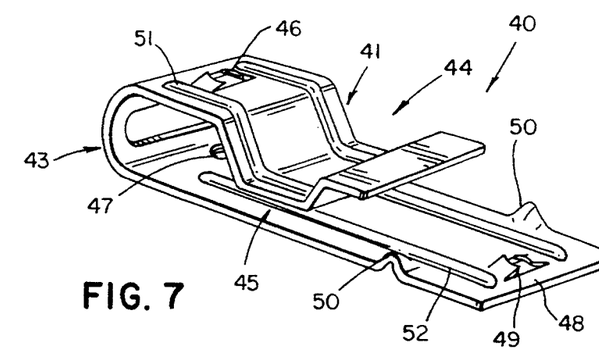

FIGS. 6 and 7 illustrates a further form of clip 40 according to the present invention for a different style of vehicle hood and protector. The clip 40 which is formed preferably of spring steel, includes a first arm 41 and a second arm 42 which are joined through being integrally formed at one end via a U-shaped section 43. One arm 42 is substantially planar while the other arm 41 has a portion 44 stepped downwardly towards the other arm 41 to define a narrow slot 45 therebetween. The arm 41 is provided with a threaded or thread engagable aperture 46, whilst the other arm 42 is provided with an opening 47 aligned with the threaded aperture 46. The arm 42 additionally extends beyond the arm 41 to define a tongue or flange 48 which is provided with a threaded or thread engagable aperture 49. A pair of transverse lugs 50 is provided in the tongue 48 forwardly of the end of the arm 41. Both arms 41 and 42 may be stiffened by stiffening ribs 51 and 52 extending therealong.

Figures 8, 9:
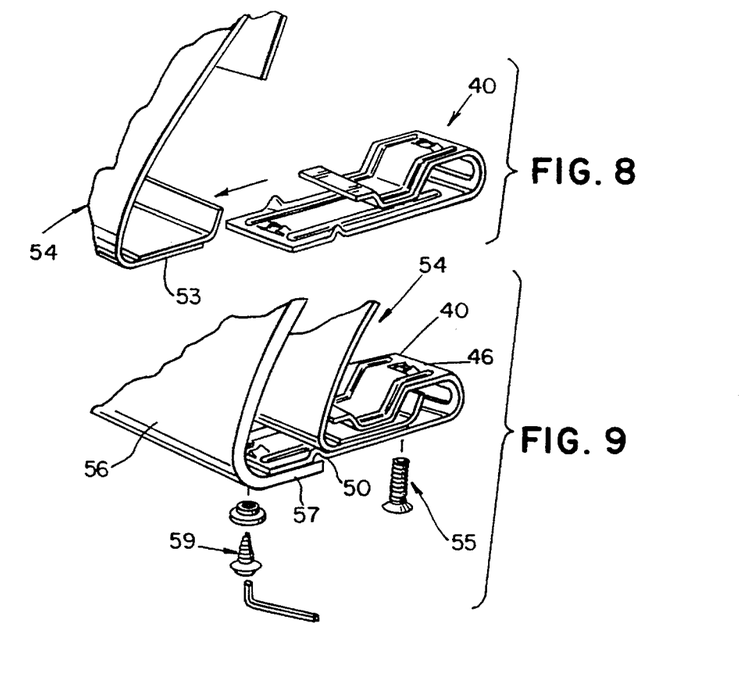
FIGS. 8 and 9 illustrate the manner in which the clip of FIGS. 6 and 7 is applied.
Figure 10:
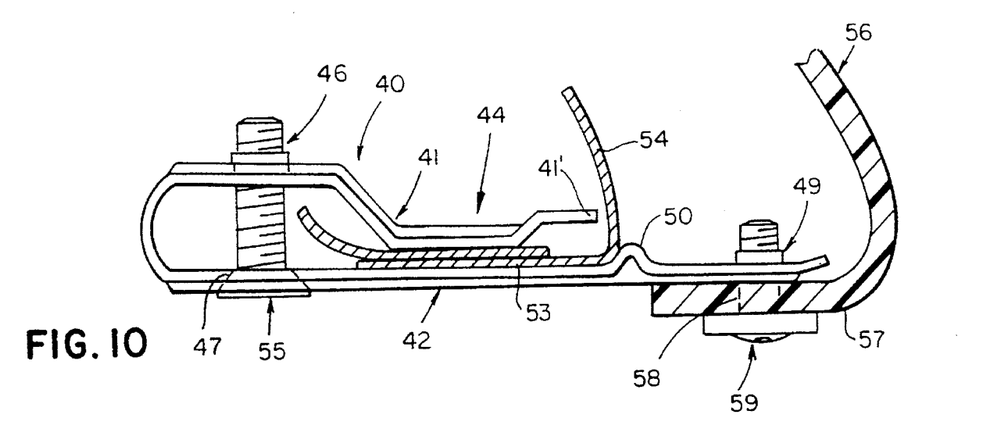
FIG. 10 illustrates in side view the assembled clip, hood and hood protector.
Figure 11:
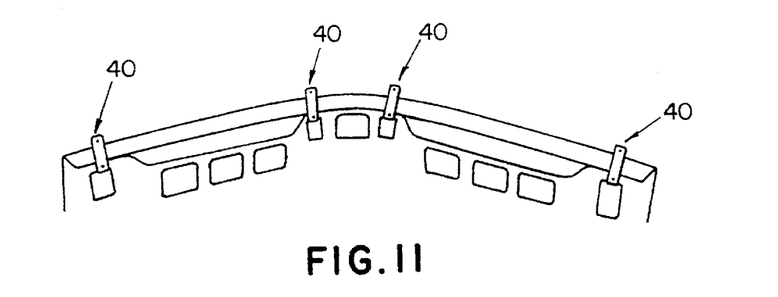
FIG. 11 illustrates the positioning of the clips of FIGS. 6 and 7 on a vehicle hood.

In use, and as shown in FIGS. 8 to 10, the clip 40 is arranged such that a return flange 53 of a vehicle hood 54 may be located between, to be gripped by the arms 41 and 42 due to the resilient nature of the arms 51 and 52. A screw fastener 55 passed into the opening 47 and threaded aperture 46 and when tightened urges the arms 41 and 42 together to clamp the flange 53 therebetween. The lugs 50 serve as stops to abut against the forward edge of the hood 54 to position the clip 40 relative to the hood 54, whilst it will be seen that the free end 41' of the arm 41 is located adjacent the opposite side of the hood 54. This arrangement limits movement of the clip 40 in opposite directions thereby self centring the clip 40 and thus minimises the risks of detachment of the clip 40 from the hood 54. The flange 42 being substantially planar is in face to face contact with the flange 53 of the hood 54 when the clip 40 is secured to the hood flange 53.

For securing a hood protector 56, in position, the protector 56 which also includes a return flange 57, is provided with spaced apertures 58 therealong. A screw fastener 59 may be passed, preferably through a washer, and through each aperture 58 and into the threaded hole 49 of the tongue or flange 48 to firmly secure the hood protector 56 in position. Clips 40 of the above type may be provided at spaced positions along the hood 54 as shown in FIG. 8.

For detachment, the screws 55 may be loosened so that the clips 10 may be disengaged from the flange 53. For detachment of the hood protector 56, the screws 59 may be simply removed.

Figure 2:
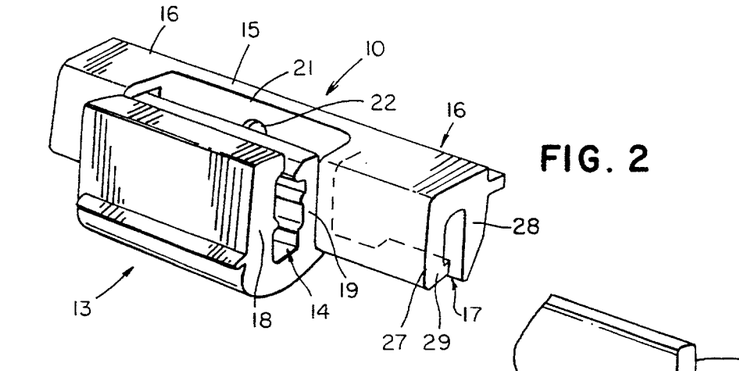
FIG. 2 illustrates in perspective view a first form of retaining clip according to the present invention.

Many variations may be made to the embodiments described above. For example, the clip 10 of FIG. 2 may have only one clip portion 16 rather than two. Additionally, both clip portions may be constructed such that they grip the hood and protector by the resilience in the arms of the respective channels without requiring screws 23.

With regards to the embodiment of FIGS. 6 to 10, the clip 40 may not require the lugs 50, and may, in place of the planar flange or tongue 48, be provided with a channel to receive the portion 57 of the protector 56. The arms 41 and 42 may also be configured to grip by their inherent resilience.

Figure 12:
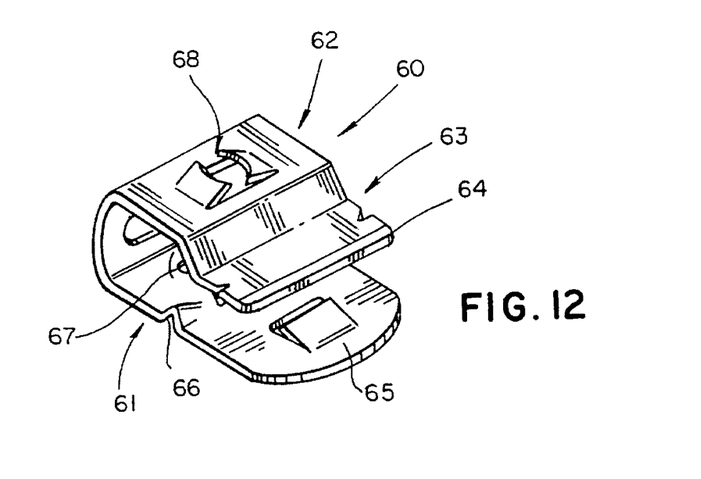
FIG. 12 illustrates a further form of retaining clip according to the present invention.

Referring now to FIG. 12 there is illustrated a further embodiment of retaining clip 60 according to the invention which again is preferably formed of spring steel. The clip 60 is of generally U shaped form and includes a substantially planar lower flange 61 and an upper flange 62 spaced from the lower flange 61. The upper flange 62 includes a downwardly stepped portion 63 which terminates in an upwardly inclined free end 64. The lower flange 61 also includes an upwardly inclined location member 65 which is adapted to locate within a slot in the vehicle bonnet guard. The lower flange 61 also includes on opposite sides a pair of deformations or lugs 66 which act as locating stops. The lower flange 61 further includes between the locating stops 66 and the end of the clip 60 a centrally located countersunk aperture 67. A further aperture 68 is formed in the upper flange 62 in alignment with the aperture 67, the aperture 68 defining a thread engaging configuration for engagement by a screw fastener.

Figure 13:
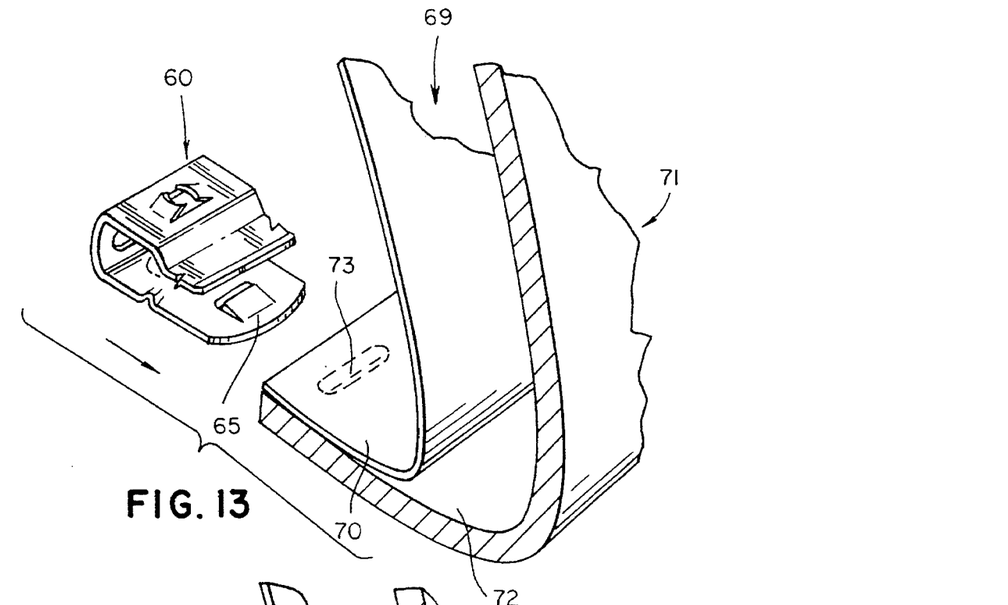
FIGS. 13 and 14 illustrate the manner in which the clip of FIG. 12 is used.

This clip 60 is designed for use with a vehicle bonnet 69 of the type having a generally planar return flange portion 70 and a hood protector 71 having a planar return flange portion 72 which is arranged to be juxtaposed in the manner shown in FIG. 13 with the flange portion 70 of the hood 69. The flange portion 72 is provided with a series of slots 73 therealong adjacent to its trailing edge as shown in FIG. 13 in dotted outline.

Figures 14, 15:
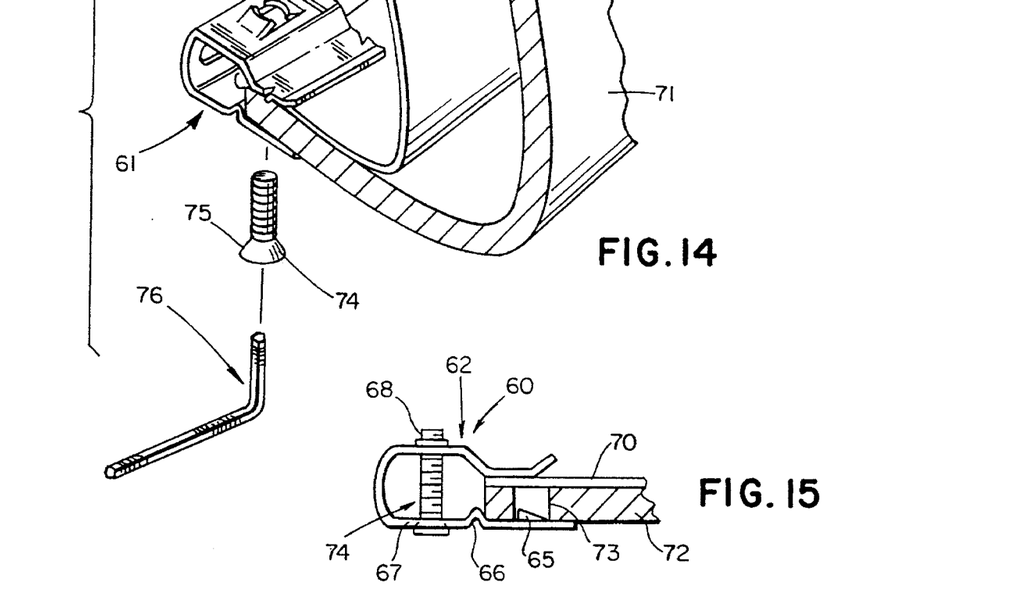
FIG. 15 illustrates the clip of FIG. 12 securing the hood protector in position.

For securing the protector 71 to the hood 69, the clips 60 are positioned adjacent to respective slots 73 and pushed over the juxtaposed flanges 70 and 72 in the direction of the arrow in FIG. 13 until the locating members 65 snap into the openings 73 (see FIG. 15). In this position the protector 71 is held to the hood 69 by the flanges 61 and 62 due to the resilient nature of the clip 60. To fully secure the hood protector 71 to the hood 69 a screw 74 is inserted into the opening 67 and threadably engaged with the opening 68 and tightened. The screw 74 may have a head 75 provided with a hexagonal recess to receive an Allen key 76 which can effect tightening thereof and which will draw the opposite flanges 61 and 62 towards each other to firmly clamp the protector 71 in position to the hood 69.

Figure 16:
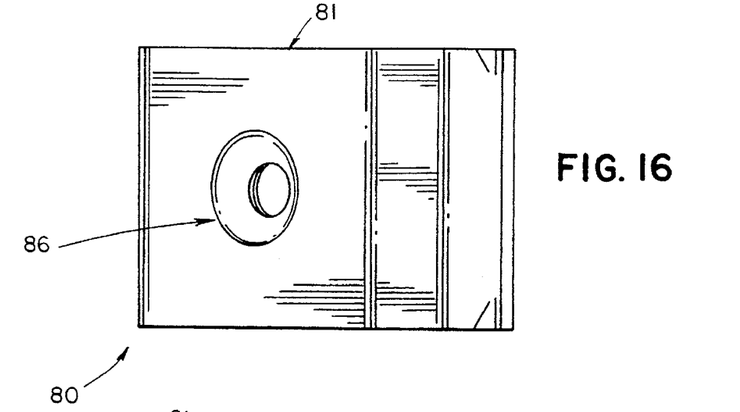
FIGS. 16 and 17 illustrates in plan and perspective views a further form of clip according to the invention.
Figure 17:
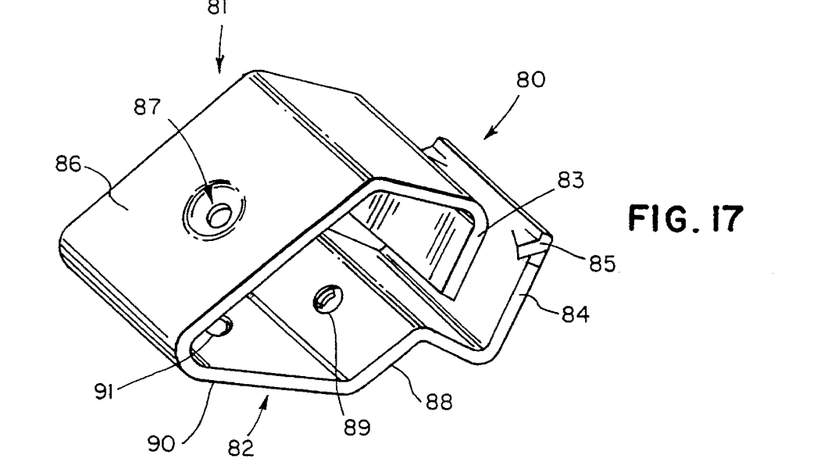

Referring now to FIGS. 16 and 17 there is illustrated a further form of retaining clip 80 in accordance with the present invention. The clip 80 is formed from a length of strip which is hardened so as to be of a resilient nature and which may be coated with a plastic coating such as nylon to prevent damage to a vehicle hood protector with which the clip 80 is to be used. The clip 80 includes opposite legs 81 and 82, the leg 81 terminating in a return flange portion 83 which is substantially parallel to an end flange portion 84 of the leg 82. The free corners of the end portion 84 are turned inwardly to define barbs 85. A flange portion 86 of the leg 81 is provided with a central counter sunk aperture 87 whilst an opposite substantially parallel flange portion 88 of the leg 82 is provided with a central aperture 89 aligned with the aperture 86, the aperture 89 having a thread engaging formation for receiving a screw in the manner described below. A further flange portion 90 of the leg 82 which is adjacent to the leg 81 is also provided with a central aperture 91 which again is threaded or provided with a thread engaging formation to receive a screw.

Figure 18:
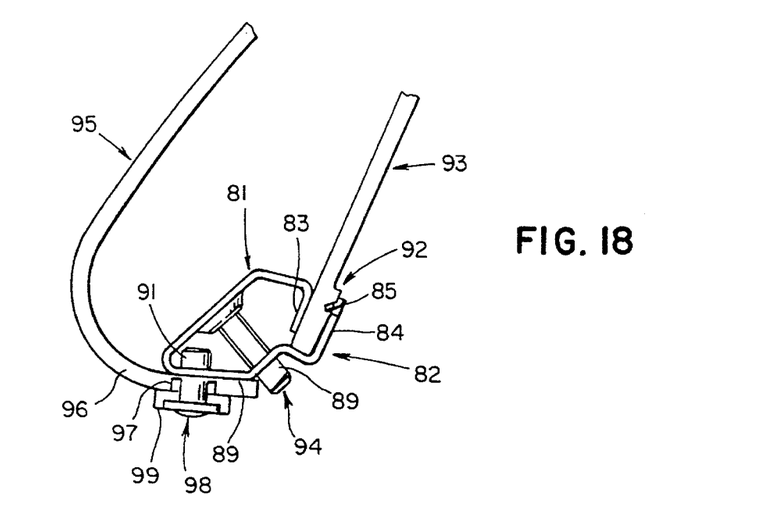
FIG. 18 illustrates in side elevational view the manner in which the clip of FIGS. 16 and 17 is used.

In use and as shown in FIG. 18 the clip 80 is arranged such that the portions 83 and 84 of the legs 81 and 82 are arranged on opposite sides of the lower free edge 92 of a vehicle hood 93. A screw 94 having a counter sunk head is passed through the opening 87 to threadably engage the aperture 89 and may be tightened to urge the legs 81 and 82 towards each other to securely clamp the end 92 of the hood 93 between the portions 83 and 84. Positive engagement is enhanced by the turned up barbs 85 at the corners or the flange 84. A bonnet protector 95 having a return flange 96 and series of spaced apart apertures 97 therein is positioned relative to the hood 93 such that one of the apertures 97 is aligned with the threaded aperture 91 of the clip 80. A screw 98 may then be passed through a washer 99 and the aperture 97 to be threadably engaged with the aperture 91. The screw 98 is tightened to securely hold the protector 95 to the hood 93.

A series of such clips 80 may be provided at spaced apart positions along the vehicle hood 93 to secure the protector 95 to the hood 93.

It would be seen that in each of the above described embodiments, no apertures are required to be drilled in the vehicle hood to enable a bonnet protector to be secured to the hood. Gripping of the hood is achieved by means of the resilient gripping forces achieved due to the inherent nature of the materials used for the clips and the additional clamping action effected by means of the threaded fasteners which extend between or engage the gripping portions. It will be appreciated that the design of the clips may be considerably varied from that shown in the drawings without varying the inventive concept.

Whilst the above has been given by way of illustrative embodiment of the invention, all such modifications and variations thereto as would be apparent to persons skilled in the art are deemed to fall within the broad scope and ambit of the invention as defined in the appended claims.

I claim:

1. A retaining clip for securing a hood protector or shield to a vehicle hood, said vehicle hood having a rearwardly extending return flange, said retaining clip including first and second spaced apart gripping arms, means interconnecting one end of said arms, said arms being adapted to be located on opposite sides of said return flange of said hood, and means for selectively urging said first and second gripping arms relatively towards each other to cause said arms to grip said return flange of said hood to retain said clip to said hood, one of said arms having a portion extending forwardly beyond the other said arm so as to extend forwardly of said hood, and means for attaching said hood protector or shield to said extending portion of said one arm whereby said hood protector or shield may be secured to said hood.

2. A retaining clip according to claim 1 wherein said first and second gripping arms define a channel or recess therebetween into which said return flange of said hood may project.

3. A retaining clip according to claim 2 wherein said urging means comprises a screw fastener which extends between said first and second gripping arms.

4. A retaining clamp according to claim 1 wherein said means for attaching said hood protector or shield to said extending portion of said one arm comprises a screw fastener adapted to be passed through said protector for threaded engagement with said extending portion of said one arm.

5. A retaining clamp according to claim 1 wherein stop means are provided on said one arm, said stop means being adapted to abut said hood to locate said clip relative to said hood.

6. A retaining clamp according to claim 5 wherein said stop means comprise lugs formed in said one arm.

7. A retaining clamp according to claim 1 wherein said other said arm is stepped inwardly towards said one arm.

8. A retaining clamp according to claim 1 wherein said means interconnecting one end of said arm comprises means integrally interconnecting and spacing said arms apart.

9. A retaining clamp according to claim 8 wherein said arms are integrally formed of spring steel.

10. A retaining clamp according to claim 1 wherein said one arm has an aperture therein adjacent said interconnecting means and wherein the other said arm includes a threaded opening whereby said means for selectively urging said arms towards each other comprises a screw fastener passing through said aperture and in threaded engagement with said threaded aperture.

11. A hood protector or shield adapted to be mounted to the hood of a vehicle to extend transversely of said vehicle, said hood having a return flange extending rearwardly from a lower portion thereof, and at least one retaining clip for securing said hood protector or shield to said vehicle hood, said retaining clip having first and second integral spaced apart gripping arms, said gripping arms being adapted to be located on opposite sides of said return flange of said vehicle hood, means extending between said first and second gripping arms and adapted to be actuated to urge said gripping arms relatively towards each other to cause said arms to grip said return flange of said hood, one said arm having a portion extending forwardly beyond said other arm so as to extend in use forwardly of said hood, and means for attaching said hood protector or shield to said extending portion of said one arm.

12. A retaining clamp according to claim 11 wherein said one arm includes stop means intermediate its ends, said stop means engaging an outer side of said hood to locate said clip relative to said hood.

13. A retaining clamp according to claim 11 wherein said extending portion of said one arm includes a threaded aperture and wherein said means for attaching said protector or shield to said extending portion of said one arm comprises a threaded fastener passing through said protector or shield and engaging with said threaded configuration in said portion of said arm.

14. A hood protector or shield secured to the hood of a vehicle by at least one retaining clip, said hood having a return flange, and said at least one retaining clip having upper and lower integral spaced apart gripping arms, said upper gripping arm being located on an upper side of said return flange of said vehicle hood and said lower gripping arm being located on the lower side of said return flange of said vehicle hood, means extending between said upper and lower gripping arms and urging said gripping arms relatively towards each other to cause said arms to grip said return flange of said hood, said lower arm having a portion projecting forwardly beyond said upper arms and said hood, and attaching means attaching said hood protector or shield to said projecting portion of said one arm.

15. A hood protector or shield according to claim 14 wherein said lower gripping arm includes stop means for engaging an outer side of said hood to locate said protector or shield relative to said hood.

16. A hood protector or shield according to claim 15 wherein said lower gripping arm includes a threaded aperture in said projecting portion and wherein said attaching means comprises a threaded fastener passing through said protector or shield and engaged with said threaded aperture.

17. A hood protector or shield according to claim 14 wherein said upper arm includes a portion stepped downwardly towards said lower arm and defining therewith a slot for accepting said return flange of said hood.

* * * * *